United States Patent
Hann

(10) Patent No.: US 7,140,688 B2
(45) Date of Patent: Nov. 28, 2006

(54) DAMPED ARMREST

(75) Inventor: Mark S. Hann, Shorewood, IL (US)

(73) Assignee: Illinois Tool Works Inc, Glenview, IL (US)

(*) Notice: Subject to any disclaimer, the term of this patent is extended or adjusted under 35 U.S.C. 154(b) by 6 days.

(21) Appl. No.: 10/870,487

(22) Filed: Jun. 17, 2004

(65) Prior Publication Data
US 2005/0029854 A1    Feb. 10, 2005

Related U.S. Application Data

(60) Provisional application No. 60/493,597, filed on Aug. 8, 2003.

(51) Int. Cl.
*A47C 7/54* (2006.01)
(52) U.S. Cl. .............................. 297/411.32; 297/411.38
(58) Field of Classification Search ........... 297/411.32, 297/411.38
See application file for complete search history.

(56) References Cited

U.S. PATENT DOCUMENTS

| | | | | |
|---|---|---|---|---|
| 3,414,324 A | * | 12/1968 | Taylor et al. | 297/90 |
| 3,909,063 A | * | 9/1975 | Bonisch et al. | 297/113 |
| 4,586,750 A | * | 5/1986 | Vogel | 297/411.32 |
| 4,848,840 A | * | 7/1989 | Toya | 297/411.32 |
| 5,316,369 A | * | 5/1994 | Kanda | 297/188.15 |
| 6,257,668 B1 | * | 7/2001 | Chou et al. | 297/411.32 |
| 6,447,069 B1 | * | 9/2002 | Terris et al. | 297/411.29 |
| 6,592,085 B1 | * | 7/2003 | Iwata et al. | 248/118.1 |
| 6,672,670 B1 | * | 1/2004 | Funk et al. | 297/411.32 |

* cited by examiner

*Primary Examiner*—Rodney B. White
*Assistant Examiner*—Joseph Edell
(74) *Attorney, Agent, or Firm*—Mark W. Croll; Paul F. Donovan

(57) ABSTRACT

A damped armrest including an armrest frame defining a bore and a fixed mandrel defining an axis about which the frame rotates. A reservoir is formed by the bore and the mandrel. Vanes on the mandrel project into the reservoir. The reservoir is filled with damping media for controlling rotation of the frame about the mandrel.

18 Claims, 2 Drawing Sheets

DAMPED ARMREST

CROSS-REFERENCE TO RELATED APPLICATIONS

This United States Patent Application claims the benefits of U.S. Provisional Application Ser. No. 60/493,597, filed Aug. 8, 2003.

FIELD OF THE INVENTION

The present invention relates generally to movable vehicle armrests and, more specifically, the invention pertains to damping mechanisms for controlling movement of the armrest.

BACKGROUND OF THE INVENTION

Seating arrangements in vehicles often provide individual seats for the driver and at least some passengers. In vans, trucks, motor homes and the like, passengers and drivers may access the individualized seat provided for them by sliding into the seat from a side thereof. Egress from the seat may be achieved in the same manner.

For comfort, relaxation and a feeling of security, it is known to provide armrests along the sides of the individualized seats. In some seat designs, the armrests are formed integrally with the seat bottom and/or seat back. However, ingress and egress around fixed armrests can be difficult. It is known to provide one or more of the armrests rotatably connected to the seat. In a known design, the armrest is connected by a pivotal axis secured to the seat back. The armrest is rotatable from a substantially horizontal orientation to a substantially vertical orientation, more or less in line with the seat back. Passengers and drivers alike can enter and exit the seat easily and conveniently by raising the armrest and thereby removing the obstacle from the path for substantial, lateral movement into and out of the seat.

An uncontrolled pivotally mounted armrest can fall from the raised position, suddenly and unexpectedly. Since the armrest is pivotally connected to the seat near one end of the armrest, the weight of the armrest causes rapid acceleration of the armrest towards the lowered position. After a period of use, the armrest may be sufficiently worn that only a slight bump or jar of the seat or armrest can cause the armrest to fall from the raised to the lowered position. This can be inconvenient for elderly people or people with physical infirmities that create difficulties in entering and leaving the seat. Unintended lowering of the armrest also can present difficulties for adults attempting to position children in the seat, or in a child seat secured to the vehicle seat.

Therefore, it is desirable to provide controlled movement of the armrest between raised and lowered positions. Desirably, the armrest will move in a steady, smooth pace throughout the entire range of movement between the raised and lowered positions.

SUMMARY OF THE INVENTION

The present invention provides a vehicle seat armrest damper mechanism integrally formed with the pivotal axis of the armrest, to control movement of the armrest.

In one aspect thereof, the present invention provides a damped armrest having controlled movement of the armrest about an axial connection of the armrest to a seat. The armrest has a frame defining a bore therethrough and a mandrel secured in the bore. The frame is rotatable about the mandrel, and the mandrel is adapted for connection to the seat. A cap closes the bore and defines a reservoir in the bore between the cap and the mandrel. Vanes in the reservoir are fixed with respect to one of the bore and the mandrel and having relative rotation with respect to the other of the bore and the mandrel. Damping media is disposed in the reservoir.

In another aspect thereof, the present invention provides a damped armrest with a fixed mandrel and a frame rotatable about the mandrel. A reservoir is defined by the frame and the mandrel. Vanes in the reservoir are fixed with respect to one of the mandrel and the frame. Damping media is disposed in the reservoir.

In a further aspect thereof, the present invention provides a damper for an armrest having a frame and a mandrel about which the frame rotates. The damper has a reservoir defined in a bore of the frame; vanes on the mandrel disposed in the reservoir; and damping media filling the reservoir.

An advantage of the present invention is providing a damping structure to control the movement of an armrest between raised and lowered positions so that the armrest moves steady and smooth throughout the range of movement.

Another advantage of the present invention is providing a damped armrest that is easily assembled and installed.

A further advantage of the present invention is providing a damper mechanism for an armrest of a vehicle seat, that allows the armrest to be easily and conveniently removed from the supporting structure of the seat and reattached to the supporting structure of the seat.

A still further advantage of the present invention is providing a simple and inexpensive damper for a vehicle armrest that operates smoothly and effectively for an extended period of time.

Other features and advantages of the invention will become apparent to those skilled in the art upon review of the following detailed description, claims and drawings in which like numerals are used to designate like features.

Figure 1:
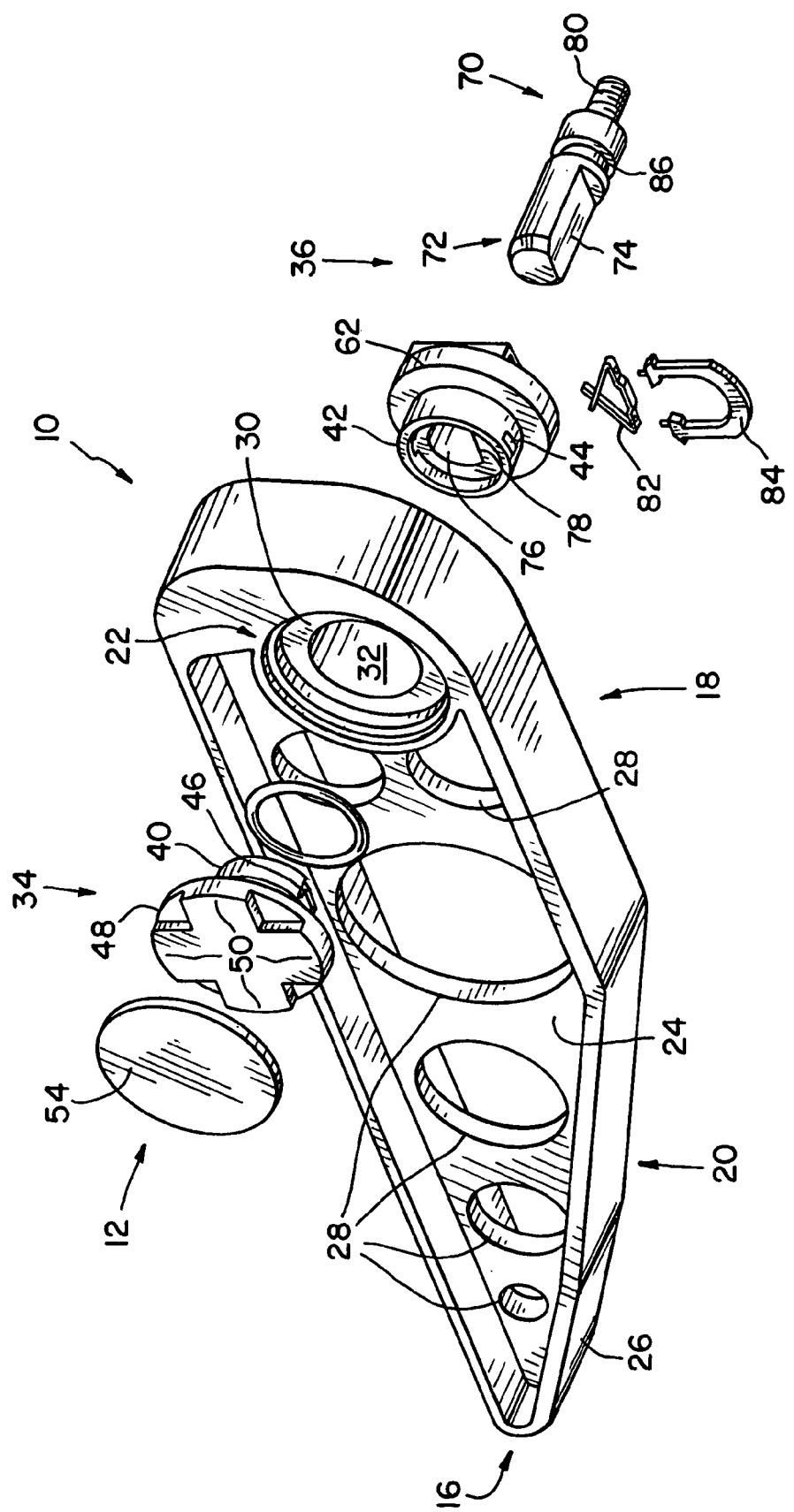
FIG. 1 is an exploded view of a vehicle armrest having a damper in accordance with the present invention.
Figure 2:
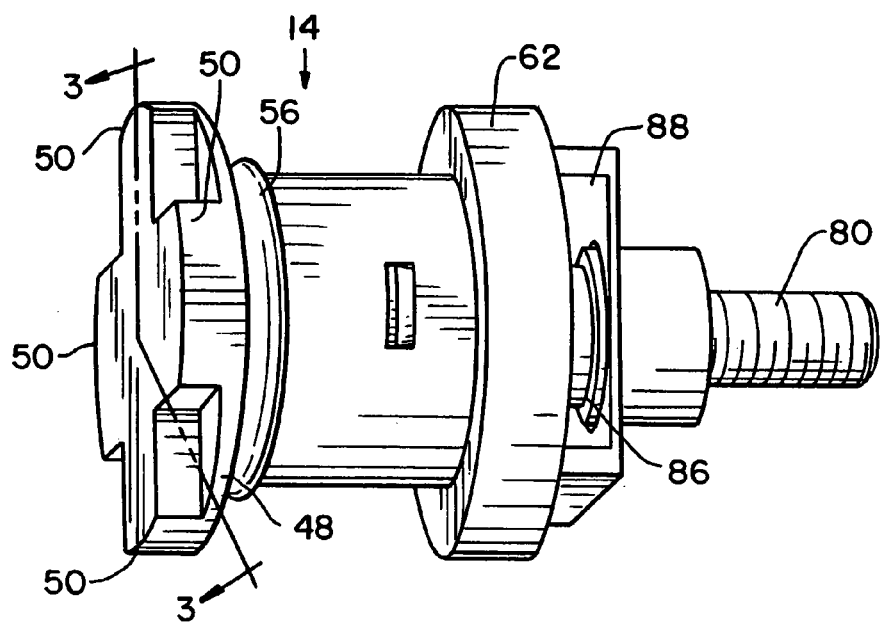
FIG. 2 is a perspective view of an assembled mandrel forming part of the damper in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, a vehicle armrest 10 is shown having an armrest damper 12 in accordance with the present invention as part of a mandrel assembly 14 defining the pivotal axis of armrest 10. Those skilled in the art will understand readily that an external covering (not shown) will be provided on armrest 10, and may include a sprayed vinyl foam that is skinned over, or other padding materials covered with a sleeve of fabric, leather or the like.

Armrest 10 includes a frame 16 of plastic or the like. Frame 16 generally defines the size, shape and general configuration of the completed armrest. The exact size, shape and general configuration of frame 16 will vary, depending upon the size, shape and configuration of the seat (not shown) on which armrest 10 is installed. In the exemplary embodiment, frame 16 has a substantially rectangular rearward portion 18 and a tapered nose portion 20 extending forwardly therefrom. Rearward portion 18 defines an aperture 22 for engaging mandrel assembly 14, as will be described hereinafter. Frame 16 has a general I-beam type construction, with a central web 24 and a peripheral flange 26 surrounding web 24. To reduce the weight of frame 16, additional holes or voids 28 are provided in web 24.

Figure 3:
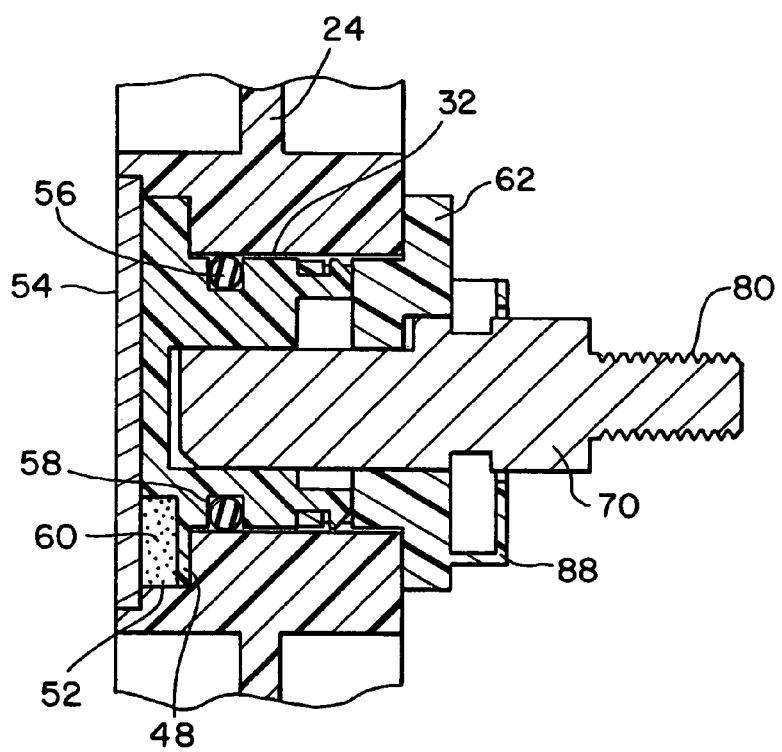
FIG. 3 is a fragmentary cross-sectional view of the assembled armrest of FIG. 1, taken along line 3—3 of the assembled mandrel shown in FIG. 2.

Aperture 22 is provided in a stepped configuration from the outboard side of frame 16, to provide an inwardly extending rim 30 about a central bore 32. Rim 30 is recessed from the outer surface of frame 16 immediately surrounding aperture 22 and may be flush with the inboard side of frame 16 as shown in FIG. 3 or can be slightly recessed therefrom.

Mandrel 14 includes damper 12 and is the pivotal axis by which armrest 10 is connected to the seat (not shown) on which it is installed and about which frame 16 rotates. Mandrel 14 includes a first, outboard component 34 and a second, inboard component 36 adapted to be connected one to another while extending through bore 32 from opposite sides of rim 30. Rim 30 is thereby sandwiched between outboard component 34 and inboard component 36 for securing mandrel 14 within aperture 22 of frame 16.

In the exemplary embodiments shown in the drawings for outboard component 34 and inboard component 36, sections thereof overlap and interconnect to secure each to the other. A male end 40 and a female end 42 are provided as primary interlocking components of outboard component 34 and inboard component 36, respectively. It should be understood that the relationship between components can be reversed, with male end 40 provided on inboard component 36, and female end 42 provided on outboard component 34. To secure male end 40 within female end 42, female end 42 is provided with one or more slots 44 for receiving one or more projections 46 from a lateral surface of male end 40. Other constructions of interconnecting outboard and inboard components also can be used.

Outboard component 34 forms a part of damper 12 and has an end plate 48 larger in diameter than male end 40. An outer surface of end plate 48 includes a series of vanes 50, four such vanes 50 shown in the exemplary embodiment. More or fewer vanes 50 can be used to alter the performance of damper 12. End plate 48 fist within aperture 22 and against rim 30 to define an essentially closed bottom of a reservoir 52 within aperture 22 when outboard component 40 is positioned therein. Vanes 50 project into reservoir 52. A cap 54 closes the outboard opening to aperture 22 and reservoir 52 defined therein. Cap 54 firms a seal with aperture 22 such as by sonic welding, bonding with adhesive, tight interference fit or the like. An O-ring 56 is retained in a channel 58 of outboard component 34 within bore 32 to provide a sliding seal between bore 32 and outboard component 34. Reservoir 52 defined within aperture 22, including the spaces between vanes 50, is filled with a damping media 60. A suitable media used for damper applications is a silicone gel or other viscous fluid.

Inboard component 36 includes an end plate 62 of larger diameter than female end 42. Female end 42 is configured to extend through bore 32 and to receive male member 44 on the inside thereof. End plate 62 fits against the inboard side of rim 30. Thus, as those skilled in the art will readily understand, male end 40 and female end 42 extend through bore 32 with end plates 48 and 62 disposed against and on opposite sides of rim 30 within aperture 22.

Mandrel 14 is attached to a seat post 70. Seat post 70 includes a keyed end 72, such as a flat segment 74 on an otherwise rounded post 70. Inboard component 36 has an axial bore 76 configured to receive keyed end 72, such as by having a generally round shape with a flat segment 78. Post 70 is configured to connect to a seat frame (not shown), such as by a threaded end 80 of post 70 to engage the frame (not shown). To secure post 70 within inboard component 36, a spring 82 and a horseshoe-shaped locking button 84 are used for releasably securing keyed end 72 in bore 76. Spring 82 engages a groove 86 on post 70, from within a pocket 88 of inboard component 36. Button 84 is also held in pocket 88, being exposed therein on opposite side of post 70 from spring 82. Button 84 extends around post 70 to engage spring 82. Depressing button 84 compresses spring 82 and allows spring 82 to slide along post 70 for connecting and disconnecting inboard component 36 and post 70.

Post 70 is fixed in position relative to a seat (not shown) on which armrest 10 is installed and is keyed to inboard component 36 in a manner preventing relative rotation therebetween. Projections 46 in slots 44 secure outboard component 34 relative to inboard component 36 such that relative rotation therebetween is prevented. Thus, the entire assembly of damper 12 within frame 16 is non-rotatably fixed by the attachment of post 70 to the seat (not shown). The only relative rotation occurs between frame 16 and mandrel 14. As aperture 22 rotates about vanes 50, with damping media encapsulated within reservoir 52 formed in aperture 22, controlled resistance is provided to the movement of frame 16. The damping effect can be varied by using damping media 58 of different viscosity or by changing the configuration of vanes 50 to provide increased or decreased resistance to the rotation and movement of aperture 22 about vanes 50.

The various components of damper 12 described herein above can be made of injection molded plastic, and can be formed inexpensively. Spring 82 may be made of spring steel. Other appropriate materials also can be used.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A damped armrest having controlled movement of the armrest about an axial connection of the armrest to a seat, said armrest comprising:
   a frame defining a bore therethrough;
   a mandrel secured in said bore with said frame being rotatable about said mandrel, said mandrel adapted for connection to the seat;
   a sliding seal between said bore and said mandrel;
   a cap closing said bore and defining a reservoir in said bore between said cap and said mandrel;
   vanes in said reservoir fixed with respect to one of said bore and said mandrel and having relative rotation with respect to the other of said bore and said mandrel; and
   damping media disposed in said reservoir, such that upon movement of the armrest, said damping media provides controlled resistance during movement of the armrest.

2. The damped armrest of claim 1, said damping media being silicon gel.

3. The damped armrest of claim 1, including a post releasably connected to said mandrel and adapted to be secured to the seat.

4. The damped armrest of claim 1, said sliding seal being an O-ring.

5. The damped armrest of claim 1, said frame defining an aperture having an annular rim defining said bore.

6. The damped armrest of claim 5, said mandrel including an outboard component and an inboard component extending into said bore from opposites sides of said annular rim.

7. The damped armrest of claim 6, said outboard component and said inboard component connected to each other.

8. The damped armrest of claim 1, said vanes being fixed relative to said mandrel.

9. The damped armrest of claim 1, said vanes being integrally formed with said mandrel.

10. A damped armrest having controlled movement of the armrest about an axial connection of the armrest to a seat, said armrest comprising:
    a frame defining a bore therethrough, said frame defining an aperture having an annular rim defining said bore;
    a mandrel secured in said bore with said frame being rotatable about said mandrel, said mandrel adapted for connection to the seat, said mandrel including an outboard component and an inboard component extending into said bore from opposites side of said annular rim, said outboard component and said inboard component connected to each other, said outboard component having an end plate;
    a sliding seal between said bore and said mandrel;
    a cap closing said bore and defining a reservoir in said bore between said cap and said mandrel;
    vanes in said reservoir fixed with respect to one of said bore and said mandrel and having relative rotation with respect to the other of said bore and said mandrel, said vanes being fixed on said end plate; and
    damped media disposed in said reservoir.

11. A damped armrest comprising:
    a fixed mandrel;
    a frame rotatable about said mandrel;
    a reservoir defined by said frame and said mandrel;
    vanes in said reservoir fixed with respect to one of said mandrel and said frame, said vanes projecting into a space defined by said reservoir;
    damping media disposed in said reservoir; and
    a cap closing said reservoir to capture said damping media, such that upon movement of the armrest, said damping media in cooperation with said vanes, provides controlled resistance during movement of the armrest so as to control the movement of the armrest.

12. The damped armrest of claim 11, said damping media being silicone gel.

13. The damped armrest of claim 12, said vanes disposed on said mandrel.

14. The damped armrest of claim 11, said vanes being integrally formed with said mandrel.

15. The damped armrest of claim 11, including a post connected to said mandrel adapted for attachment to a seat.

16. The damped armrest of claim 15, said frame defining a bore, said mandrel including an outboard component and an inboard component extending through said bore from opposite sides thereof, said outboard component and said inboard component adapted to be secured non-rotatably to each other.

17. The damped armrest of claim 16, said inboard component being releasably secured to said post.

18. The damped armrest of claim 17, said post having a keyed end and said inboard component having a bore configured to receive said keyed end while prohibiting relative rotation between said post and said inboard component.

* * * * *